United States Patent [19]
Levinson

[11] Patent Number: 4,881,789
[45] Date of Patent: Nov. 21, 1989

[54] INTEGRATED OPTICAL COUPLER AND CONNECTOR

[75] Inventor: Frank H. Levinson, San Mateo County, Calif.

[73] Assignee: Finisar Corporation, Menlo Park, Calif.

[21] Appl. No.: 198,979

[22] Filed: May 26, 1988

[51] Int. Cl.$^4$ .............................................. G02B 6/26
[52] U.S. Cl. .............................. 350/96.15; 350/96.20
[58] Field of Search ................. 350/96.15, 96.16, 96.2, 350/96.21

[56] References Cited

U.S. PATENT DOCUMENTS

| | | | |
|---|---|---|---|
| 4,284,449 | 8/1981 | Stone | 350/96.15 X |
| 4,306,765 | 12/1981 | Winzer et al. | 350/96.16 |
| 4,378,143 | 3/1983 | Winzer | 350/96.15 |
| 4,439,005 | 3/1984 | Winzer | 350/96.15 |
| 4,456,329 | 6/1984 | Henderson et al. | 350/96.16 |
| 4,545,644 | 10/1985 | DeVeau, Jr. et al. | 350/96.21 |
| 4,691,986 | 9/1987 | Aberson et al. | 350/96.21 |
| 4,701,011 | 10/1987 | Emkey et al. | 350/96.18 |
| 4,765,706 | 8/1988 | Marcatili et al. | 350/96.16 |

FOREIGN PATENT DOCUMENTS 63-49710  3/1988  Japan ................................ 350/96.16

OTHER PUBLICATIONS

Lightguide Splicing Manual-ATT (1985).

*Primary Examiner*—John D. Lee
*Attorney, Agent, or Firm*—Flehr, Hohbach Test, Albritton & Herbert

[57] ABSTRACT

There is disclosed an optical fiber coupler made from three separate ferrules formed from a continuous glass capillary tube having a capillary bore of suitable diameter for receiving optical fibers. The three ferrules include first and second end ferrules and a middle ferrule, the middle ferrule having a removed window portion exposing a portion of its capillary bore and two ferrule coupling ends on both sides of the removed window portion. An optical fiber is mounted in the capillary bore of the middle ferrule, and a beamsplitter is inserted in the optical fiber at a position exposed by the removed window portion. In addition, an optical element is coupled to the window portion of the middle ferrule so as to be in optical communication with the beamsplitter means. Finally, the coupler is completed by coupling alignment sleeves that couple and align the two ferrule coupling ends of the middle ferrule to the first and second end ferrules when optical fibers are mounted in the first and second ferrules.

4 Claims, 6 Drawing Sheets

INTEGRATED OPTICAL COUPLER AND CONNECTOR

The present invention relates to optical fiber circuit elements, and particularly to optical couplers which passively couple light from one or more optical fibers or light sources to one or more optical fibers or light detectors.

BACKGROUND OF THE INVENTION

U.S. Pat. Nos. 4,545,644 and 4,691,986, which are hereby incorporated by reference, describe optical connectors in which optical fibers are cemented into a pair of glass ferrules that are subsequently mated in a secondary alignment sleeve. U.S. Pat. No. 4,545,644 discloses an optical interconnection which is tuned using a secondary alignment sleeve. The '986 patent discloses a method of forming an optical connector using a "continuous" ferrule material in order to form a connection in which the receiving bores are inherently in nearly perfect alignment. The product based on these patents is now sold under the trade name of the ATT Rotary Mechanical Splice.

This same interconnect technology has also been used to build a unique wavelength selective coupler as disclosed in U.S. Pat. No. 4,701,011. This patent teaches how to embed a short piece of multimode graded index fiber in the end of a glass ferrule so that a small, ¼ pitch, graded index rod lens is formed. When a single mode fiber is coupled to this lens, the light emerging from the single mode fiber will be collimated. Using this technique, a wavelength selective signal mode fiber optic coupler can be constructed by placing a wavelength selective filter between two ferrules housing single mode fibers.

Other coupler designs which employ beamsplitting techniques are also well known in the optical communications industry. For example, U.S. Pat. No. 4,306,765 shows a fiber optic coupler using a dielectric beamsplitter deposited on a polished fiber face.

A major limitation of most prior art optical couplers is that these couplers do not incorporate a low cost, low loss mechanism for easily connecting the coupler to a fiber optic network. For example, while the optical coupler disclosed by Winzer et al. in U.S. Pat. No. 4,306,765 provides a low loss optical coupler, it is produced with fiber optic "pigtails" which must be either spliced or otherwise processed in order to connect the coupler to a fiber network. In another example, while the coupler structure proposed by Emkey et al. in U.S. Pat. No. 4,701,011 utilizes elements that interconnect, the coupler disclosed does not include apparatus for integrating the device into a optical fiber system; rather the disclosed device has pigtails that must be connected to a fiber optic system in an undisclosed manner.

It is therefore an object of the present invention to provide an optical fiber coupling structure which can achieve excellent coupling efficiency and which also incorporates an interconnection port for connecting the coupling structure to an additional optical channel.

SUMMARY OF THE INVENTION

In summary, the present invention is an optical fiber coupler made from three separate ferrules formed from a continuous glass capillary tube having a capillary bore of suitable diameter for receiving optical fibers. The three ferrules include first and second end ferrules and a middle ferrule, the middle ferrule having a removed window portion exposing a portion of its capillary bore and two ferrule coupling ends on both sides of the removed window portion. An optical fiber is mounted in the capillary bore of the middle ferrule, and a beamsplitter is inserted in the optical fiber at a position exposed by the removed window portion. In addition, an optical element is coupled to the window portion of the middle ferrule so as to be in optical communication with the beamsplitter means. Finally, the coupler is completed by coupling alignment sleeves that couple and align the two ferrule coupling ends of the middle ferrule to the first and second end ferrules when optical fibers are mounted in the first and second ferrules.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
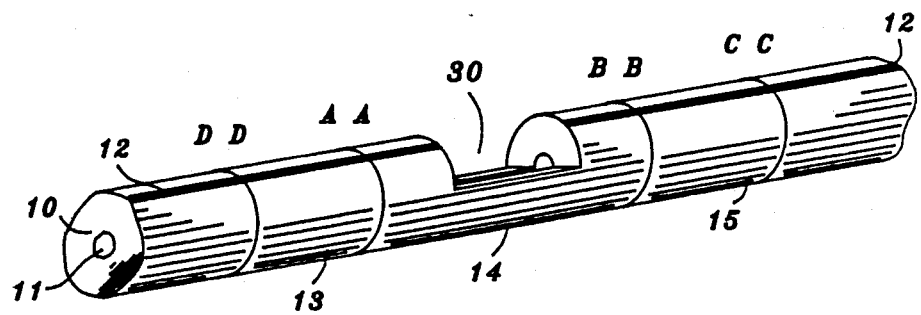
FIG. 1 is a schematic representation of a continuous piece of glass ferrule stock used as the raw material for making an optical connector.
Figure 2A:
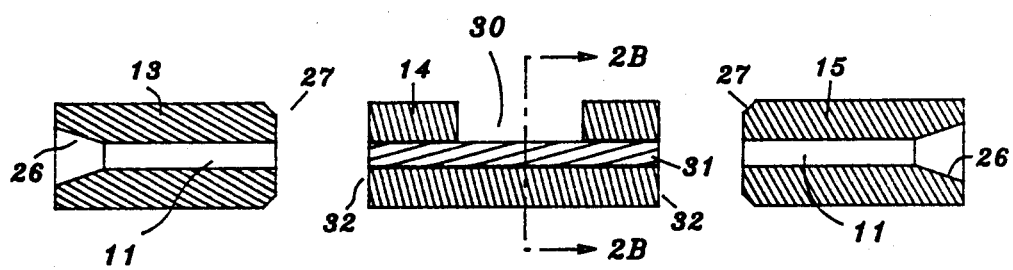
FIGS. 2A and 2B are drawings of the basic components of an optical coupler after some of the initial fabrication steps.
Figure 2B:
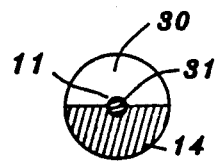
Figure 3:
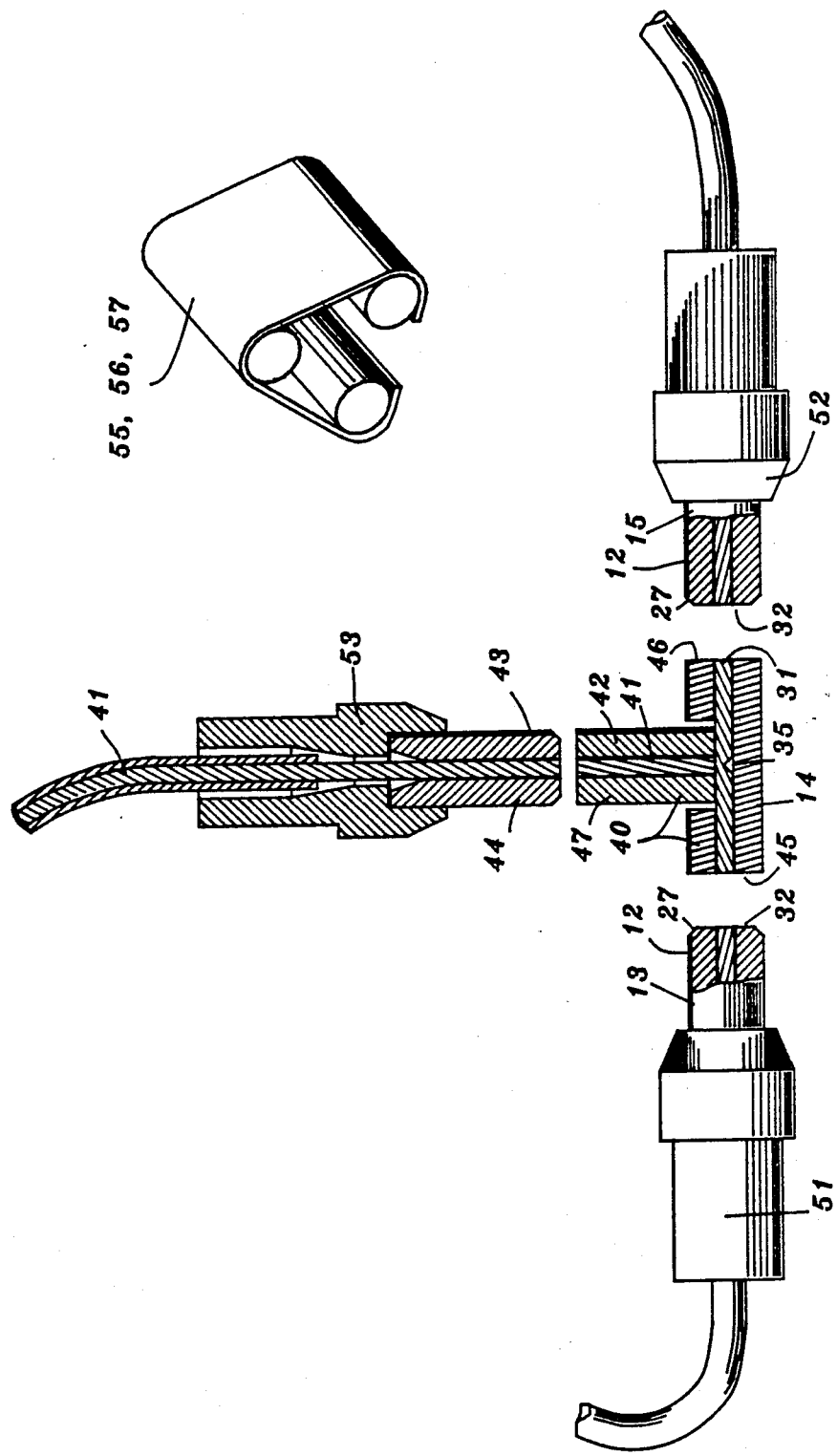
FIG. 3 schematically depicts a first preferred embodiment of a coupler with an integrated optical connector.

Referring to FIGS. 1–3, the following discussion describes the composition and steps for manufacturing an optical connection kit which can be used to connect an optical channel to an optical fiber network. An important feature of this optical connection kit is that the connector includes all of the components for making a very low loss three-way optical connection, also known as a T-coupler.

The basic raw material for making an optical connector in accordance with the present invention is a drawn glass capillary tubing 10, often called a ferrule. FIG. 1 shows a section of the capillary tubing having a bore 11 that runs the length of the tubing. As is standard, the bore 11 has a diameter which is only slightly larger than the outer diameter of an optical fiber (i.e., the cladding of an optical fiber) that is to be housed by the tubing. The tubing 10 also has an inscribed alignment line 12 running the length of the tube. The line 12 is ground or drawn into the capillary tube in continuous fashion during the fabrication of the tubing.

The first step of the coupler fabrication process is to cut the capillary tube 10 into three sections 13, 14 and 15. The two outer sections 13 and 15 are herein called end plugs, and the middle section 14 is called the coupler interconnection piece. Typically, the capillary tube 10 is cut by scribing circumferential lines AA, BB, CC and DD on the tube, and then fracturing the tube along these scribe lines.

Referring to FIG. 2A, the resulting rough tube ends of the end plugs 13 and 15 are heat or chemically treated to produce flared ends 26, and are ground so as to produce chamfered facets 27. The interconnection piece 14 is processed by grinding out a window portion 30 (see FIG. 1) from its middle section until the capillary bore inside is partially exposed, as shown in cross section in FIG. 2B. An optical fiber 31 which is approximately the length of the interconnection piece 14 is then cemented into the bore 11 of the interconnection piece 14. Then the endfaces 32 of the interconnection piece 14 are also ground, polished and chamfered so as to produce polished faces appropriate shaped and polished for coupling with the end plugs 13 and 15. Note that the interconnection piece 14 is not coupled to the end plugs 13 and 15 until optical fibers are cemented into these end plugs and the faces of the end pieces are polished suitably for fiber optic connections.

Referring to FIG. 3, the initial fabrication of the interconnection piece 14 is completed by inserting a beamsplitter 35 at a 45° angle in the fiber 31, preferably in the middle of the exposed portion of the fiber. A large number of techniques for forming beamsplitters in optical fibers are known to those skilled in the art. See for example U.S. Pat. No. 4,306,765.

A variety of different beamsplitters having different effects on the light travelling down an optical fiber are available. The particular beamsplitter 35 used in the interconnection piece 14 will depend on the intended use of the connection kit being manufactured. For instance, in some applications the beamsplitter 35 will be a multicoated piece of very thin silicon, while in other applications the beamsplitter may be formed by cutting the fiber at a 45° angle and then coating the fiber ends with coating layers appropriate for the beamsplitting function to be performed. In addition, different beamsplitters can be used to divert different amounts of the optical power in the fiber 31, to divert only light with a selected polarization, and/or to separate different portions of the light spectrum.

Figure 4:
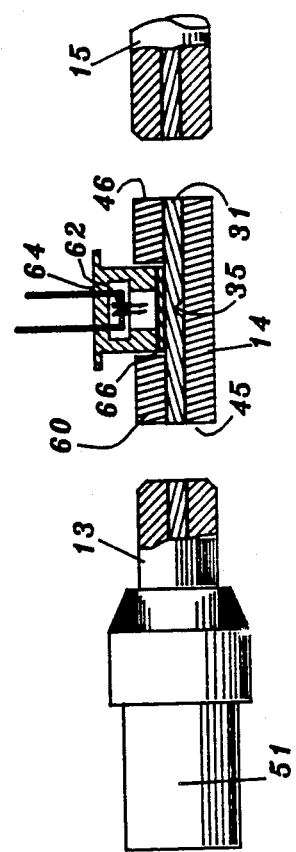
FIG. 4 shows a second preferred embodiment of a coupler with an integrated port for an optical source or detector.
Figure 5:
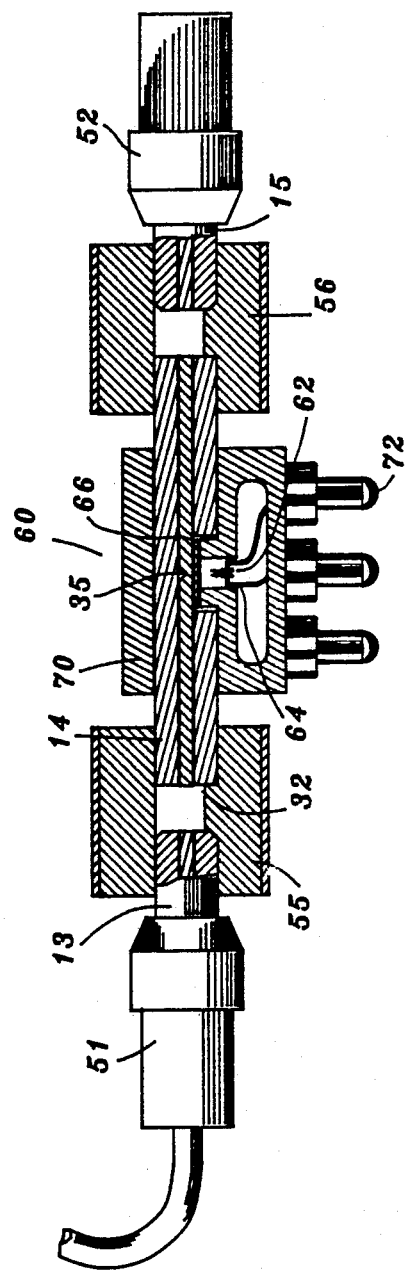
FIG. 5 shows a third preferred embodiment which is a variation of the coupler shown in FIG. 4.

Once the beamsplitter 35 has been inserted or mounted in the fiber 31, any one of a number of different optical elements may be mounted over the beamsplitter 35 to form a three-way optical connector 40. FIGS. 4-6, described below, show several variations on the basic three-way connector 40 configuration shown in FIG. 3.

Continuing to refer to FIG. 3, in one preferred embodiment the interconnection piece 14 is coupled to another optical fiber 41 so as to form a three-way connector junction. The additional optical fiber 41 is mounted in a glass capillary 42, both ends of the ferrule and fiber are suitably polished for coupling to another optical fiber, and then the fiber and ferrule 41 and 42 are coupled to the window portion 30 of the interconnection piece 14 so that beamsplitter 35 forms a three-way junction with fibers 31 and 41. In other words, light flowing through fiber 31 and deflected by the beamsplitter 35 will be directed into fiber 41, and vice versa.

The resulting assembly of interconnection piece 14, fiber 31, beamsplitter 35, ferrule 42 and its fiber 41 is herein referred to as the three-way connector 40, more commonly known as an optical T-coupler.

The same ferrule fabrication technique described above with respect to FIG. 1 is used to provide a low loss optical coupler for an optical fiber 41, so that this branch of the connector 40 can be efficiently coupled to an optical network. Thus, a single capillary tube (not shown) is used to form two contiguous capillary ferrules 42 and 44 from adjacent segments of the single capillary tube. Ferrules 42 and 44 have matching inscribed alignment lines 43 running the length of the ferrules to facilitate connecting and aligning the ferrules when coupling the connector 40 to an optical network. In effect, then, ferrule 44 is the end plug for the third branch of the connector 40.

As shown in FIG. 3, each branch 45, 46 and 47 of the T-coupler 40 is the end of a ferrule which has a corresponding end piece formed from an adjacent segment of capillary ferrule stock so that each branch can be connected to an optical network with a low loss coupling junction. In addition, housing members 51, 52 and 53 are mounted on the outer ferrules 13, 15 and 44 of each connector branch. The housing members facilitate handling of he outer ferrules when coupling the outer ferrule to their corresponding mate.

The final components of the basic connector kit shown in FIG. 3 are three alignment sleeves 55, 56 and 57—one for each of the branches 45, 46 and 47 of the connector 40. The alignment sleeves 55-57 are used to hold complementary pairs of ferrules in alignment when the connector 40 is inserted into an optical network.

In summary, the complete connector kit shown in FIG. 3 comprises
three end plugs 13, 15 and 44 with housing members 51, 52 and 53,
three alignment sleeves 55, 56 and 57 for coupling and aligning each end piece 13, 15 and 44 with its corresponding ferrule ending in the three-way connector 40, and
a T-coupler 40, which comprises
an interconnection piece 14 with an optical fiber 31 mounted in its bore 11, a window portion 30 removed exposing a portion of the fiber 31,
a beamsplitter 35 inserted in the portion of fiber 31 exposed by window 30,
a ferrule 42 with an optical fiber 41 in its bore mounted on the window portion 30 of the interconnection piece 14 so that beamsplitter 35 forms a three-way junction with fibers 31 and 41.

The alignment sleeves 55-57 are not used until each of the outer ferrules 13, 15 and 44 has had an optical fiber cemented into its bore and the junction ends of the ferrules and fibers have been suitable polished for optical coupling to the three-way connector 40. Each alignment sleeve receives one outer ferrule or end plug 13, 15 or 44 and the ferrule from the corresponding branch of the three-way connector 40. The outer ferrule in each alignment sleeve is inserted until it touches the face of the ferrule from the three-way connector 40 and then rotated in the alignment sleeve until the scribe line 12 or 43 on the end plug aligns with the scribe line on the connector 40.

If further reduction of the coupling loss at each fiber junction is desirable, the fiber junction can be tuned using techniques well known to those skilled in the art, such as the tuning method described in the Lightguide Splicing, Rotary Mechanical Splice manual by AT&T Technical Training Services (1985), which is hereby incorporated by reference.

Referring to FIG. 4, a second preferred embodiment of a three-way optical coupler 60 is formed by replacing the ferrule and fiber 42 and 41 in FIG. 3 with a photodiode 62 mounted in housing 64 that is positioned above the beamsplitter 35. Depending on the beamsplitter 35, photodiode 62 and other aspects of the system, the housing 64 may employ a simple window 66 on the face of the housing facing the beamsplitter 35. In other cases the portion of the housing facing the beamsplitter may be a lens or waveguide element for focusing the light exiting from the fiber 31 onto the active surface of the photodiode 62.

As will be understood by those skilled in the art, photodiode 62 can be replaced by a light emitting diode (LED) or laser diode to transmit optical signals into the optical fiber 31.

FIG. 5 shows that the three-way connector fiber optic coupler assembly 60 of FIG. 4, employing either a photodiode or LED 62, will normally be fabricated with a protective enclosure 70 surrounding the portion of the connector 60 containing the beamsplitter 35, and the photodiode or LED 62 and its housing 64. It is anticipated that some embodiments of the protective enclosure 70 will be fabricated with standard dual-inline package (DIP) connector pins 72 on the bottom of the protective enclosure 70 so that the circuitry in the enclosure 70 can be easily connected to circuitry on a printed circuit board.

Figure 6A:
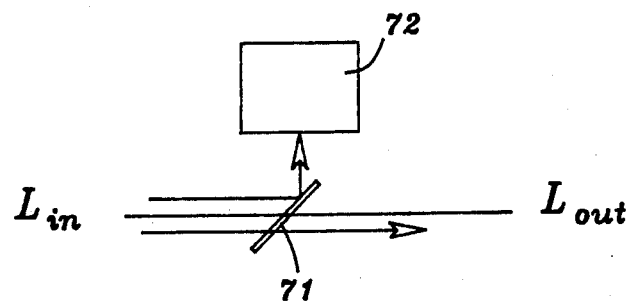
FIGS. 6A–6E schematically depict several coupler circuits which can be constructed using the present invention.
Figure 6B:
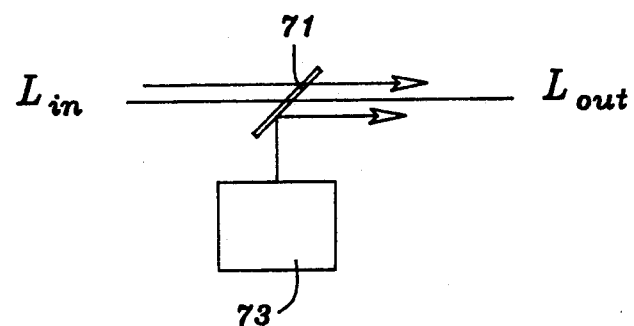

FIGS. 6A–6E schematically show a number of optical circuits that can be formed using the T-couplers or three-way connectors described above. FIG. 6A shows a read tap structure in which a wavelength insensitive beamsplitter 71 is utilized to deflect light in the line to a local receiver 72. FIG. 6B shows a write tap structure similar to FIG. 6A, with the receiver 72 replaced by a transmitter 73.

Figure 6C:
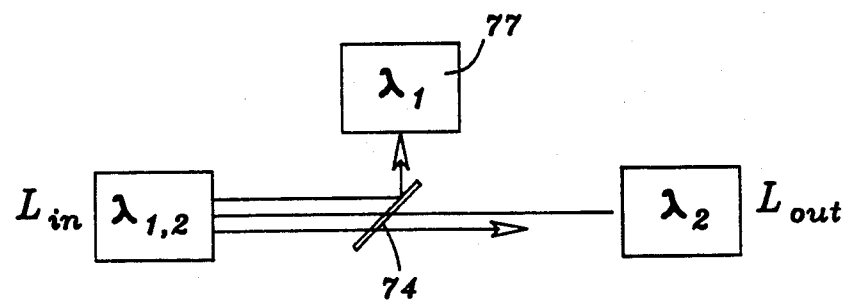

FIG. 6C shows one use of a beamsplitter 74 with a wavelength selective coating utilized in a three-way connector, forming a wavelength multiplexer/demultiplexer or wavelength selective tap. In the particular example shown, the output from a multiwavelength transmitter 75 is split into two paths with distinct wavelengths by the beamsplitter 74, with one receiver 76 receiving light of one wavelength and another receiver 77 receiving light of another wavelength.

Figure 6D:
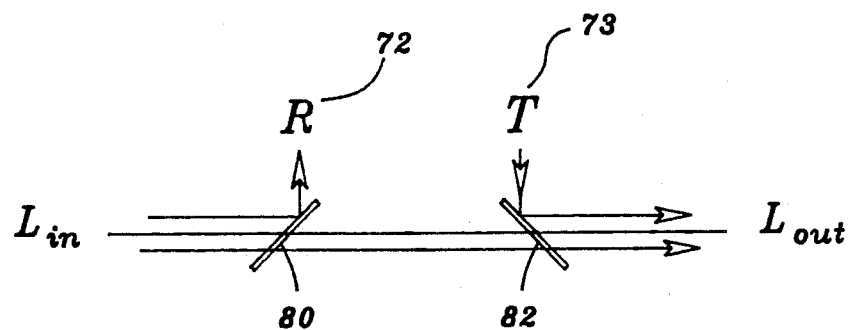
Figure 6E:
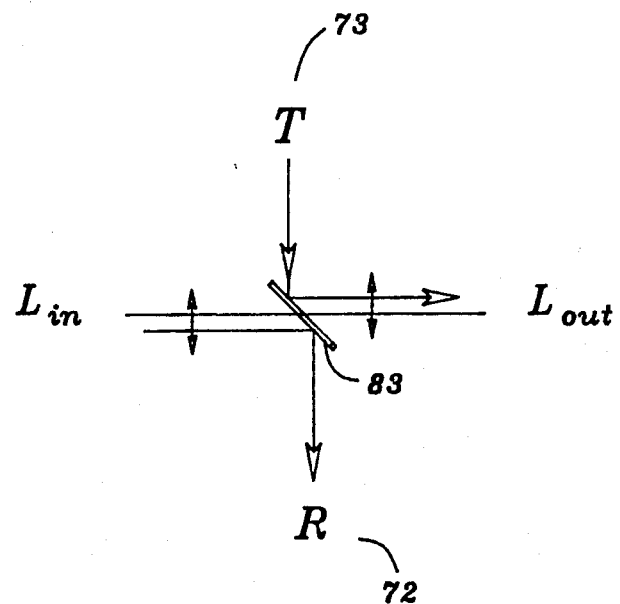

In FIG. 6D two separate beamsplitters 80 and 82 are placed into a fiber line to form an "add/drop" node so that information can be both read and written to the fiber optic line. FIG. 6E shows an add/drop arrangement using a single beamsplitter 82 with a wavelength selective coating. In this arrangement, the fiber optic line can be tapped directly with polarized sources such as laser diodes.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An optical fiber coupler comprising:
   three separate ferrules formed from a continuous glass capillary tube having a capillary bore of suitable diameter for receiving optical fibers; said three ferrules including first and second end ferrules and a middle ferrule, said middle ferrule having a removed window portion exposing a portion of its capillary bore and two ferrule coupling ends on both sides of said removed window portion;
   an optical fiber mounted in the capillary bore of the middle ferrule;
   beamsplitter means inserted in said optical fiber at a position exposed by said removed window portion of said middle ferrule;
   an optical element coupled to the window portion of said middle ferrule so as to be in optical communication with said beamsplitter means; and
   coupling alignment means for coupling and aligning said two ferrule coupling ends of said middle ferrule to said first and second end ferrules when optical fibers are mounted in said first and second end ferrules.

2. An optical fiber coupler as set forth in claim 1, including
   first and second additional ferrules formed from a continuous glass capillary tube having a capillary bore of suitable diameter for receiving optical fibers;
   an optical fiber mounted in the capillary bore of said first additional ferrule; and
   additional coupling alignment means for coupling and aligning said first and second additional ferrules;
   said first additional ferrule comprising said optical element coupled to the window portion of said middle ferrule.

3. An optical fiber coupler as set forth in claim 1, said optical element comprising a fiber optic receiver.

4. An optical fiber coupler as set forth in claim 1, said optical element comprising a light emitting diode.

* * * * *